(12) United States Patent
Pieczul

(10) Patent No.: US 9,569,614 B2
(45) Date of Patent: *Feb. 14, 2017

(54) CAPTURING CORRELATIONS BETWEEN ACTIVITY AND NON-ACTIVITY ATTRIBUTES USING N-GRAMS

(71) Applicant: International Business Machines Corporation, Armonk, NY (US)

(72) Inventor: Olgierd S. Pieczul, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,105

(22) Filed: May 3, 2016

(65) Prior Publication Data

US 2016/0371486 A1  Dec. 22, 2016

Related U.S. Application Data

(63) Continuation of application No. 14/741,484, filed on Jun. 17, 2015.

(51) Int. Cl.
    G06F 21/56    (2013.01)
    G06F 21/55    (2013.01)
    G06F 17/30    (2006.01)

(52) U.S. Cl.
    CPC ....... *G06F 21/552* (2013.01); *G06F 17/30486* (2013.01); *G06F 21/554* (2013.01); *G06F 21/56* (2013.01); *G06F 2221/034* (2013.01)

(58) Field of Classification Search
    CPC  G06F 21/552; G06F 17/30486; G06F 21/554; G06F 21/56; G06F 2221/034
    (Continued)

(56) References Cited

U.S. PATENT DOCUMENTS 7,639,714 B2    12/2009  Stolfo et al.
8,706,758 B2 *   4/2014  Chew ..................... G06Q 40/02
                                                         705/30
(Continued)

FOREIGN PATENT DOCUMENTS

JP         5372956 B2    12/2013

OTHER PUBLICATIONS

Hiraishi et al., "Behavior Modeling in Physical and Adaptive Intelligent Services," 2014 IEEE International Inter-Disciplinary Conference on Cognitive Methods in Situation Awareness and Decision Support (CogSIMA), pp. 244-249.

(Continued)

*Primary Examiner* — Harunur Rashid
*Assistant Examiner* — Sakinah Taylor
(74) *Attorney, Agent, or Firm* — David Zwick

(57) ABSTRACT

Identifying correlations between events recorded in a computer system log, the recorded events are generated by a plurality of processes executing on the computer. A system log is partitioned into a plurality of segments, each segment associated with a characteristic found in an event, each segment including one or more events having a same characteristic value. A plurality of attributes of the events in a segment are selected. The attributes selected do not describe an action of the event. One or more distinct n-grams are generated, each distinct n-gram including the selected attributes from successive events within the segment. A distinct n-gram is distinct from all other generated n-grams. A correlation is identified for each first selected attribute of each successive event of an n-gram with all other second selected attributes from each successive event of the n-gram, and the correlations are recorded for each first selected attribute.

4 Claims, 6 Drawing Sheets

(58) Field of Classification Search
USPC .......................................................... 726/23
See application file for complete search history.

(56) References Cited

U.S. PATENT DOCUMENTS

| | | | |
|---|---|---|---|
| 8,887,286 B2 | 11/2014 | Dupont et al. | |
| 2005/0060643 A1* | 3/2005 | Glass | G06F 17/241 715/205 |
| 2012/0265784 A1 | 10/2012 | Hsu et al. | |
| 2014/0279747 A1 | 9/2014 | Strassner | |
| 2015/0379429 A1* | 12/2015 | Lee | G09B 5/00 706/11 |

OTHER PUBLICATIONS

Pieczul et al., "Collaborating as Normal: Detecting Systemic Anomalies in Your Partner," Lecture Notes in Computer Science, vol. 8809, 2014, pp. 18-27.

Xu et al., "Efficient Summarization Framework for Multi-Attribute Uncertain Data," SIGMOD '14, Jun. 22-27, 2014, Snowbird, UT, USA, pp. 1-12.

Zolotukhin et al., Online Anomaly Detection by Using N-gram Model and Growing Hierarchical Self-Organizing Maps, Wireless Communications and Mobile Computing Conference (IWCMC), 2012 8th International, Aug. 27-31, 2012, pp. 47-52.

Mao et al., "Web Mimicry Attack Detection Using HTTP Token Causal Correlation," International Journal of Innovative computing, Information and Control, vol. 7, No. 7(B), Jul. 2011, pp. 4347-4362.

Pieczul et al., "The dark side of the code," International Workshop on Security Protocols, 2015, pp. 1-12.

Pieczul et al., "I'm OK, you're OK, the system's OK: Normative security for systems," NSPW '14, Sep. 15-18, 2014, Victoria, BC, Canada, pp. 1-10.

Pieczul et al., "Discovering Emergent Norms in Security Logs," 6th Symposium on Security Analytics and Automation 2013, pp. 438-445.

Wikipedia, "N-gram," http://en.wikipedia.org/wiki/N-gram, Accessed on Jun. 11, 2015, pp. 1-5.

Pending U.S. Appl. No. 14/741,484, filed Jun. 17, 2015, entitled: "Capturing Correlations Between Activity and Non-Activity Attributes Using N-Grams", pp. 1-46.

IBM, List of IBM Patents or Patent Applications Treated as Related, Appendix P, dated May 3, 2016, 2 pages.

Pending U.S. Appl. No. 14/741,484, filed Jun. 17, 2015 entitled: "Capturing Correlations Between Activity and Non-Activity Attributes Using N-Grams", p. 1-46.

* cited by examiner

| 302 n-gram 01 | | |
|---|---|---|
| ATTRS OF EVENT 04 | ATTRS OF EVENT 05 | ATTRS OF EVENT 06 |

| 304 n-gram 02 | | |
|---|---|---|
| ATTRS OF EVENT 03 | ATTRS OF EVENT 04 | ATTRS OF EVENT 05 |

| 306 n-gram 03 | | |
|---|---|---|
| ATTRS OF EVENT 07 | ATTRS OF EVENT 08 | ATTRS OF EVENT 09 |

| 308 n-gram 04 | | |
|---|---|---|
| ATTRS OF EVENT 02 | ATTRS OF EVENT 03 | ATTRS OF EVENT 04 |

| 310 n-gram 05 | | |
|---|---|---|
| ATTRS OF EVENT 06 | ATTRS OF EVENT 07 | ATTRS OF EVENT 08 |

| 312 n-gram 06 | | |
|---|---|---|
| ATTRS OF EVENT 32 | ATTRS OF EVENT 33 | ATTRS OF EVENT 34 |

| 314 n-gram 07 | | |
|---|---|---|
| ATTRS OF EVENT 01 | ATTRS OF EVENT 02 | ATTRS OF EVENT 03 |

| 316 n-gram 08 | | |
|---|---|---|
| ATTRS OF EVENT 35 | ATTRS OF EVENT 36 | ATTRS OF EVENT 37 |

| 318 n-gram 09 | | |
|---|---|---|
| ATTRS OF EVENT 05 | ATTRS OF EVENT 06 | ATTRS OF EVENT 07 |

| 320 n-gram 10 | | |
|---|---|---|
| ATTRS OF EVENT 09 | ATTRS OF EVENT 10 | ATTRS OF EVENT 11 |

| 322 n-gram 11 | | |
|---|---|---|
| ATTRS OF EVENT 08 | ATTRS OF EVENT 09 | ATTRS OF EVENT 10 |

Figure 3

CAPTURING CORRELATIONS BETWEEN ACTIVITY AND NON-ACTIVITY ATTRIBUTES USING N-GRAMS

BACKGROUND

The present invention relates to the capture of correlations for use in behavioral models and more particularly to the capture of correlations between activity and non-activity attributes using n-grams.

In data processing security, anomaly detection is a technique of comparing new activity in a computer system with known "normal" activity patterns in the computer system. Typically, normal activity is learned from past operation of the computer system. Various prior art techniques differ in the model of "normal" behavior they use.

N-grams are useful in implementing approximate matching of current activity and past activity of the computer system. Further information about n-grams can be found at http://en.wikipedia.org/wiki/N-gram. In the past, it has been shown that n-gram models can be used to implement anomaly detection.

SUMMARY

Embodiments of the present invention disclose a method, computer program product, and system for identifying correlations between events recorded in a system log of a computer in which the recorded events are generated by a plurality of processes executing on the computer. The computer partitions a system log into a plurality of segments, each segment associated with a characteristic found in an event, each segment including one or more events having a same characteristic value. The computer then selects a plurality of attributes of the one or more events in a segment. The plurality of attributes selected do not describe an action of the event. The computer generates one or more distinct n-grams, each distinct n-gram including the selected attributes from successive events within the segment. A distinct n-gram is distinct from all other generated n-grams. A correlation is identified for each first selected attribute of each of the successive events of an n-gram with all other second selected attributes from each of the successive events of the n-gram, and the correlations are recorded for each first selected attribute.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 shows n-grams generated from the strands of FIG. 1, in accordance with an embodiment of the present invention;

DETAILED DESCRIPTION

Figure 1:
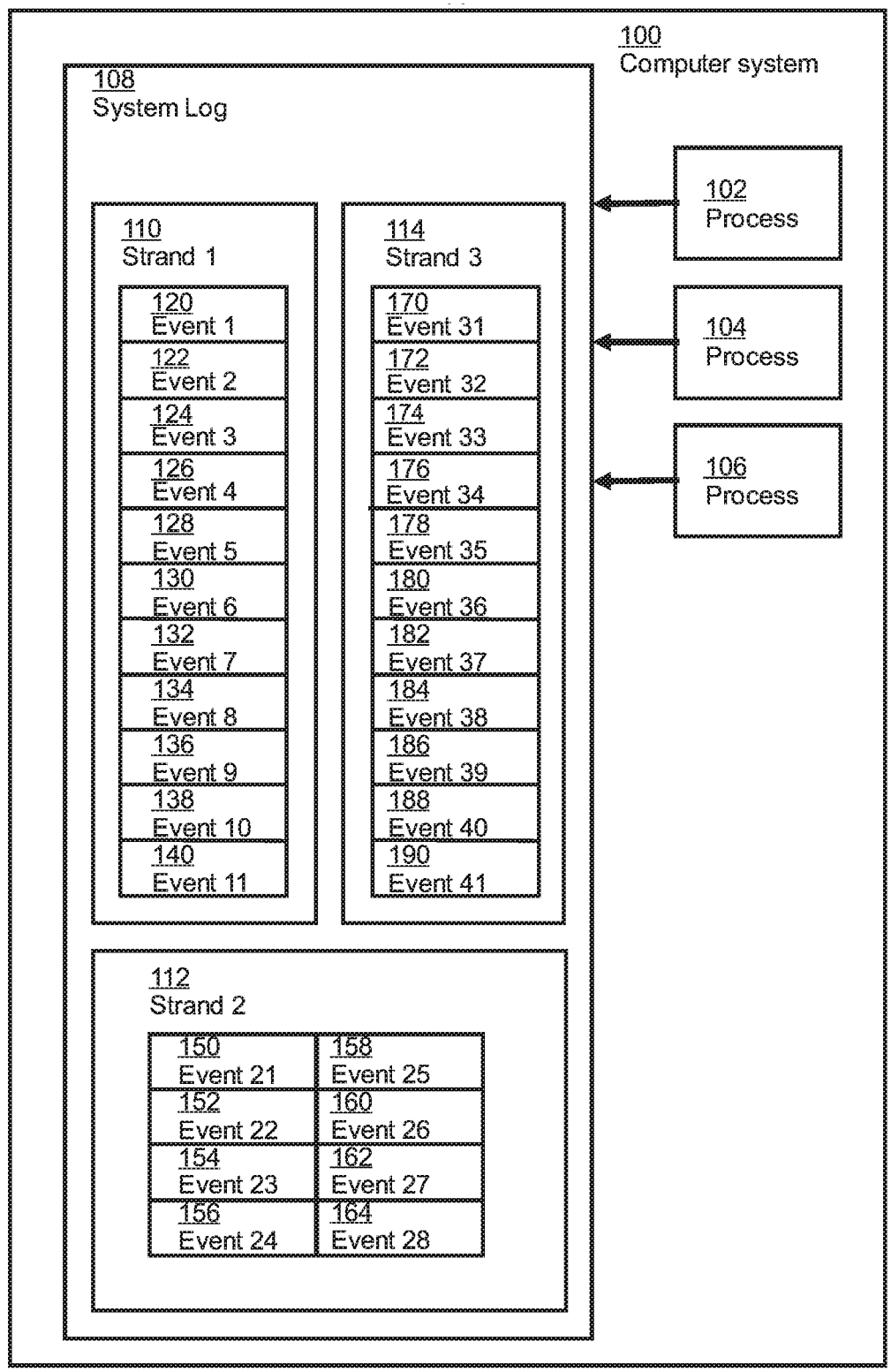
FIG. 1 shows a computer system having a plurality of processes which generate events which are stored in a system log, the system log being separated into three strands, each strand including multiple events, in accordance with an embodiment of the present invention.

FIG. 1 shows a computer system 100 having a plurality of processes 102, 104, 106 which generate events 120, 122, 124, 126, 128, 139, 132, 134, 136, 138, 140, 150, 152, 154, 156, 158, 160, 162, 164, 170, 172, 174, 176, 178, 180, 184, 186, 188, 190 which are stored in a conventional system log 108, in accordance with an embodiment of the present invention. System log 108 data is a useful source of information for monitoring security violations and identifying incidents. System log 108 may record a sequence of system and/or application events 120-190 in chronological order, such as event 1 120, event 2 122, then event 21 150, then event 31 170, event 32 172, then event 3 124 and so on. The system log 108 of FIG. 1 shows the events grouped by strand 110, 112, 114, rather than chronological order. Processes 102-106 may be any combination of system processes or application processes. Any number of processes may be present in the computer system 100, typically many more than the three shown. Similarly, there will typically be a much larger number of events 120-190, but only a small number of events 120-190 are shown for clarity. One or more of processes 102-106 may be, for example, an order processing application which generates events in a system log 108 when a first user, a client, creates an order, browses through a list of items, views and selects individual items and submits an order. It may also generate events in the system log 108 when the order is processed by a second user, a sales representative, who issues an invoice and when the invoice is then opened by the first user. The above example of a process is purely exemplary and one or more of processes 102-106 may be any other application that generates events in a system log.

A trace is a sequence of events 120-190 in chronological order. A strand 110-114 is a trace of events 120-190 that share a common characteristic. Any trace can be partitioned into a set of strands 110-114 that preserve the event 120-190 ordering within the strand from the original trace, each event 120-190 within each of the strands 110-114 being in chronological order within that strand 110-114. Again, there will typically be many more than the three strands 110-114 shown. The common characteristic of the events 120-190 in a strand may be one of the attributes of the event 120-190. An exemplary event 120-190 is:

frank PUT/order/1d261e

Events 120-190 are made up of attributes, some attributes are activity attributes that describe an action taken, while others are non-activity attributes that are associated with the activity attributes. In the above exemplary event, "frank" is the person generating the event, "PUT" is the HTTP method, "order" is the first part of the path and "1d261e" is the entity on which the operation is being carried out. Each of these portions of the exemplary event, recorded in the system log 108, is an attribute of the event, with "PUT" and "order" being activity attributes and "frank" and "1d261e" being non-activity attributes. Events 120-190 may have these or other attributes in any combination, the attributes in the exemplary event being purely examples of the types of attributes that might be found in an event 120-190. Embodiments of the invention will be described below based on a subset of events in an exemplary system log 108. The subset of events in the exemplary system log 108 includes events 120-190 generated by three different transaction-like processes 102-106.

Embodiments of the invention identify correlations between activity and non-activity attributes associated with events from the system log 108. Each of the strands 110-114 represent execution of one of the processes 102-106. Each strand 110-114 includes a UNIX-like system trace of system calls and covers scenarios such as copying data from one file to another. In the complete system log 108, there may be many more strands. Three strands 110-114 have been chosen for this description for the purposes of clarity. The exemplary subset of events associated with the three strands 110-114 from the system log 108 are described below.

In the embodiment to be described, in each of the three strands 110-114, a client creates an order, browses though the list of items, views and selects individual items. The client then submits the order which is processed by a sales representative who issues an invoice. The client then opens the invoice. The events 120-190 in each of the strands 110-114 form transaction-like sequences. An example of one of the transaction-like sequences in the strands 110-114, below, is <POST order, GET order, PUT invoice, GET invoice>. In each of the strands 110-114, the events 120-190 in the transaction-like sequences are instantiated with different users and different order identifiers.

Strand 1:
frank PUT/order/1d261e//client creates order
frank GET/items//client views list of items
frank GET/item/23//client views item 23
frank POST/cart/1d261e/23//client adds item 23 to order
frank GET/item/48//client views item 48 (decides not to add it)
frank GET/item/49//client views item 49
frank POST/cart/1d261e/49//client adds item 49 to order
frank POST/order/1d261e//client submits an order
lucy GET/order/1d261e//sales views the order
lucy PUT/invoice/1d261e//sales issues an invoice
frank GET/invoice/1d261e//client views an invoice
Strand 2:
alice PUT/order/4c4712//client creates order
alice GET/items//client views list of items
alice GET/item/18//client views item 18
alice POST/cart/4c4712/18//client adds item 18 to order
alice POST/order/4c4712//client submits an order
lucy GET/order/4c4712//sales views the order
lucy PUT/invoice/4c4712//sales issues an invoice
alice GET/invoice/4c4712//client views an invoice
Strand 3:
frank PUT/order/0ab840//client creates order
frank GET/items//client views list of items
frank GET/item/21//client views item 21
frank GET/item/21//client views item 21 a second time
frank POST/cart/0ab840/21//client adds item 21 to order
frank GET/item/48//client views item 48
frank POST/cart/0ab840/48//client adds item 48 to order
frank POST/order/0ab840//client submits an order
chris GET/order/0ab840//sales views the order
chris PUT/invoice/0ab840//sales issues an invoice
frank GET/invoice/0ab840//client views an invoice Aspects such as log pre-processing, identifying criteria to partition traces and identifying event attributes that correspond with activity are further described in O. Pieczul and S. N. Foley, "Discovering emergent norms in security logs", IEEE Conference on Communications and Network Security (CNS—SafeConfig), Washington D.C., 2013.

Figure 2:
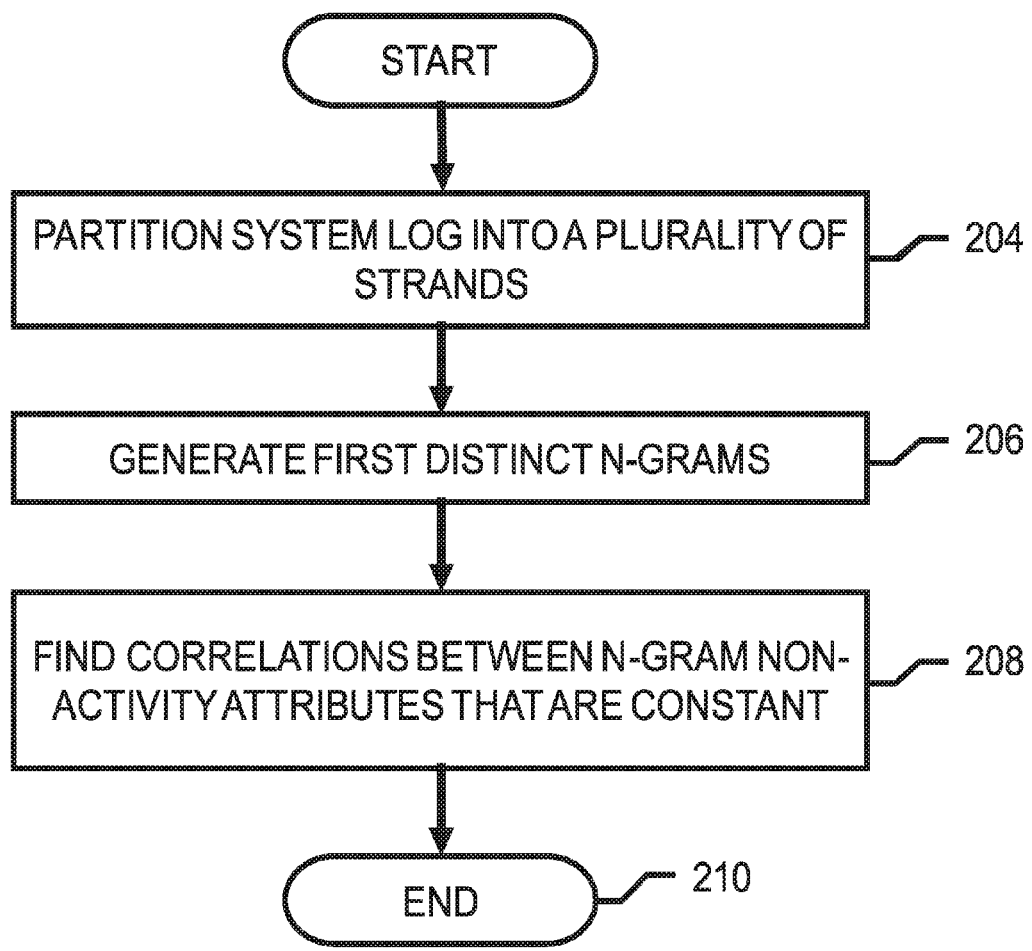
FIG. 2 shows a flow chart for generating a behavioral model, in accordance with an embodiment of the present invention.

Referring now to FIG. 2, a flow chart for generating a behavioral model, in accordance with an embodiment of the present invention, is shown. At 204, the system log 108 is partitioned into a plurality of strands 110-114, each strand 110-114 including a subset of the events 120-190 in the system log 108. Events 120-190 in each strand share a common characteristic. At 206, each of the three strands 110-114 is then decomposed into N-grams. Assuming, as previously described, that the exemplary HTTP method and first part of the path are action attributes, the three strands 110-114 are decomposed into 11 exemplary n-grams (302-322 in FIG. 3, each exemplary n-gram being a tri-gram of an attributes selected from a consecutive sequence of three input events 120-190.)

Referring now to FIG. 3, n-grams 302-322 generated at 206 (FIG. 2) from strands 1-3, 110, 112, 114 of FIG. 1, in accordance with an embodiment of the present invention, are shown. In other embodiments, other n-grams can be used. The exemplary n-grams 302, 304, 306, 308, 310, 312, 314, 316, 318, 320, 322 generated from each of strand 1 110, strand 2 112 and strand 3 114 are shown below:
[POST cart, GET item, GET item]//1 instance; events 4-6
[GET item, POST cart, GET item]//2 instances; events 3-5, 34-36
[POST cart, POST order, GET order]//3 instances; events 7-9, 24-26, 37-39
[GET items, GET item, POST cart]//2 instances; events 2-4, 22-24
[GET item, POST cart, POST order]//3 instances; events 6-8, 23-25, 36-38
[GET items, GET item, GET item]//1 instance events; 32-34
[PUT order, GET items, GET item]//3 instances; events 1-3, 21-23, 31-33
[POST cart, GET item, POST cart]//1 instance; events 35-37
[GET item, GET item, POST cart]//2 instances; events 5-7, 33-35
[GET order, PUT invoice, GET invoice]//3 instances; events 9-11, 26-28, 39-41
[POST order, GET order, PUT invoice]//3 instances; events 8-10, 25-27, 38-40

Prior art modeling behaviors uses sequences of attributes that represent activity, which in these examples are the HTTP method and path. These activity attributes are useful for detecting anomalies and getting an insight into system operation, but they are limited to capturing activity only. Typically, other information, such as the context of the activity, is not captured.

The exemplary events 120-190 in the three strands 110-114 from the system log 108 (FIG. 1) shown above reveal additional correlations between the activity attributes, such as the HTTP method and first part of the path, with the non-activity attributes, such as the second part of the path (the entity on which the activity is being carried out). In another example, the HTTP method may be correlated with the issuer of the HTTP method, such as the user (first user) to "GET" an order is also the issuer ("PUT") of an invoice. In the first 110 and second 112 strands, this user is lucy, in the third 114 strand, this user is chris. The correlation may also made that the user (second user) to place ("POST") the order is the same user to "GET" the invoice. In the first 110 and third 114 strands, this user is frank, in the second 112 strand, this user is alice. In this example, the first user and the second user are always different. This may be a reflection of a separation of duties mechanism implemented by the computer system 100 (FIG. 1). In addition, the transaction identifier in this example remains unchanged throughout the entire transaction. In the first 110 strand this is 1d261e, in the second 112 strand, this is 4c4712 and in the third 114 strand, this is 0ab840. There may be additional correlations between activity and non-activity attributes.

Capturing these correlations between activity and non-activity attributes may result in much richer model that captures behavior more precisely. Such a model may be particularly useful in anomaly detection. For example, if a single user performed an entire transaction (was both the first user and the second user as described above), it may indicate that technical security controls to enforce separation of duties are not functioning properly, or such controls might never have been put in place and the system relied on non-technical means. Similarly, if a client issues an invoice for themselves it may mean that application access control is broken.

The scenarios described above cannot be detected when modeling behavior using only activity attributes and because recording particular user names or order numbers from the system log 108, and embedding them in captured behaviors is not practical, embodiments of the present invention capture correlation and variance of attributes to model behavior.

Returning again to FIG. 2, with continuing reference to FIG. 3. At 206, non-activity attributes from each strand 110-114 are selected and distinct n-grams 302-322 are generated. Each n-gram 302-322 includes the selected non-activity attributes from successive events 120-190 within one of the strands 110-114, each n-gram 302-322 distinct from the others. Correlations between an n-gram 302-322 non-activity attribute, such as the user (client or sales), order number, or item number, that are constant in each n-gram 302-322 instance are found, at 208. For example, in Table 1 below, there are three instances of n-gram 10 320 with the sequence <GET order, PUT invoice, GET invoice> (events 09-11, 26-28 and 39-41) in which the order number is the constant attribute in each instance. Each cell of the exemplary n-grams 302-322 includes the three exemplary non-activity attributes corresponding to the event and the instance. In Table 1 below, none of the combinations of event and instance had an item number as an attribute; the user attribute was one of lucy, frank, alice, or chris; and the order number attribute was one of 1d261e, 4c4712, or 0ab840.

TABLE 1 n-gram 10 instances

| x'th event | instance 1 (EVENTS 09-11) attrs | instance 2 (EVENTS 26-28) attrs | instance 3 (EVENTS 39-41) attrs |
|---|---|---|---|
| 1 GET order | lucy 1d261e — | lucy 4c4712 — | chris 0ab840 — |
| 2 PUT invoice | lucy 1d261e — | lucy 4c4712 — | chris 0ab840 — |
| 3 GET invoice | frank 1d261e — | alice 4c4712 — | frank 0ab840 — |

Correlations between the non-activity attributes, in Table 1 above, across the three instances are shown in Matrix 1 below. The x/y represents x'th event's y'th attribute. Symbol "+" indicates that two attributes have always equal value, "−" that they always have a different value. An empty value is used when correlation cannot be established, for example, for the same attributes of the same n-gram 302-322, or when an attribute is missing. In an embodiment, only a portion of the matrix below is used, the portion being either the portion below the top left to bottom right diagonal or the portion above the top left to bottom right diagonal. The values along the diagonal itself will always have an empty value as the row and column value being correlated are the same value, for example, 1/1 and 1/1. Each value in the portion below the top left to bottom right diagonal will have a corresponding value in the portion above the top left to bottom right diagonal, for example, the correlation value for 1/4 and 1/1 and the correlation value for 1/1 and 1/4.

Matrix 1
n-gram 10 correlations

| x/y | 1/1 | 1/4 | 1/5 | 2/1 | 2/4 | 2/5 | 3/1 | 3/4 | 3/5 |
|---|---|---|---|---|---|---|---|---|---|
| 1/1 |   | − |   | + | − |   |   | − | − |
| 1/4 | − |   |   |   | + |   | − |   | + |
| 1/5 |   |   |   |   |   |   |   |   |   |
| 2/1 | + |   |   |   | − |   |   | − | − |
| 2/4 | − | + |   | − |   |   |   |   | + |
| 2/5 |   |   |   |   |   |   |   |   |   |
| 3/1 | − | − |   |   |   |   |   | − |   |
| 3/4 | − | + |   | − | + |   | − |   |   |
| 3/5 |   |   |   |   |   |   |   |   |   |

As an example, the value of the first non-activity attribute of the first event (1/1), the user that performed the GET order action, (lucy in strand 1 and strand 2, chris in strand 3) is always the equal to the value of the first non-activity attribute of the second event (2/1), the user that performed the PUT invoice action (lucy in strand 1 and strand 2, chris in strand 3). The value of the first non-activity attribute of the first event (1/1), the user that performed the GET order action, (lucy in strand 1 and strand 2, chris in strand 3) is always different than the value of the first non-activity attribute of the third event (3/1), the user that performed the GET invoice action (frank in strand 1 and strand 3, alice in strand 2).

The embodiment described above using a matrix is only one way of recording these correlations. For an n-gram 302-322 with "a" non-activity attributes, $$\frac{(n+a)*(n*a-1)}{2}$$

correlations are recorded. Because a correlation may have three possible states (always, never and unknown), a minimum of two bits are required. For example, recording 2-bit correlations of 3-grams with 3 non-activity attributes will require 9 bytes of memory per n-gram 302-322.

In another embodiment, the attributes can be given distinct labels that represent the correlation, for example:

[A1 get order A3 *]
[A1 put invoice A3 *]
[A2 get invoice A3 *]

These labels capture which non-activity attribute values are always equal or never equal.

Embodiments in which correlations have been recorded using any of the methods described above, can now identify anomalies between attributes. For example, in Table 2 below, two system log 108 fragments are depicted alongside and n-gram 302-322 with recorded attributes.

TABLE 2

| n-gram | fragment 1 (matching) | fragment 2 (not matching) |
|---|---|---|
| [A1 get order A3 *] | [lucy GET/order/ 1d261e] | [lucy GET/order/ 1d261e] |

TABLE 2-continued

| n-gram | fragment 1 (matching) | fragment 2 (not matching) |
|---|---|---|
| [A1 put invoice A3 *] | [lucy PUT/invoice/ 1d261e] | [lucy PUT/invoice/ 1d261f] |
| [A2 get invoice A3 *] | [frank GET/invoice/ 1d261e] | [frank GET/invoice/ 1d261f] |

While both fragments match the traditional activity-only 3-gram <GET order, PUT invoice, GET invoice>, only fragment 1 matches the n-gram 302-322 with non-activity attribute correlations captured. In fragment 1, the order number attribute (value=1d261e) is the constant attribute between each event of the 3-gram. In fragment 2, the order number attribute (value=1d261e) for the first event of the 3-gram does not constant with the order number attribute (value=1d262f) of the second and third events.

The same analysis can be performed for other n-grams 302-322. In Table 3 below there are two instances (events 05-07 and 33-35) of n-gram 09 318, <GET item, GET item, POST cart>. In each cell of Table 3 are shown the three non-activity attributes corresponding to the event and the instance. The constant attribute (user) for all instances of all events is the value frank. The item number attribute value is one of 21, 48, or 49. The order number attribute value is one of 1d261e or 0ab840.

TABLE 3 n-gram 09 instances

| x'th event | instance 1 (EVENTS 05-07) attrs | instance 2 (EVENTS 33-35) attrs |
|---|---|---|
| 1 GET item | frank 48 — | frank 21 — |
| 2 GET item | frank 49 — | frank 21 — |
| 3 POST cart | frank 1d261e 49 | frank 0ab840 21 |

Matrix 2
n-gram 09 correlations

| x/y | 1/1 | 1/4 | 1/5 | 2/1 | 2/4 | 2/5 | 3/1 | 3/4 | 3/5 |
|---|---|---|---|---|---|---|---|---|---|
| 1/1 |   | − |   | + | − |   | + | − | − |
| 1/4 | − |   |   |   | − | − |   | − | − |
| 1/5 |   |   |   |   |   |   |   |   |   |
| 2/1 | + |   |   |   | − |   | + | − | − |
| 2/4 | − | − |   | − |   |   | − | − | + |
| 2/5 |   |   |   |   |   |   |   |   |   |
| 3/1 | + |   |   | + |   |   |   | − | − |
| 3/4 | − | − |   | − |   |   | − |   |   |
| 3/5 | − | − |   |   | + |   | − |   |   |

This n-gram (n-gram 09 318) captures the scenario in which the user (frank) views an item twice before adding it to the cart. In the first instance the user (frank) views two different items (item 48 and item 49) and then adds the second item (item 49) to the cart. In the second instance the user (frank) views the same item (item 21) twice. In the second instance the values of the corresponding non-activity attribute "item" are equal. In the first instance, they are different. This means that there is no correlation between values of the non-activity attribute "item" for the first and second event that remains constant in all instances. But, because the user always puts the item they view in the second event to the cart, that correlation is recorded. If labels were used, the n-gram 318 may take following form:

[A1 get item * *]
[A1 get item A2 *]
[A1 post cart A3 A2]

Processing ends at 210.

Below are the instances and correlations of the remaining n-grams, that is n-grams 01-08 and 11.

TABLE 4 n-gram 01 instances

| x'th event | instance 1 (EVENTS 04-06) attrs |
|---|---|
| 1 POST cart | frank 1d261e 23 |
| 2 GET item | frank 48 — |
| 3 GET item | frank 49 — |

Matrix 3
n-gram 01 correlations

| x/y | 1/1 | 1/4 | 1/5 | 2/1 | 2/4 | 2/5 | 3/1 | 3/4 | 3/5 |
|---|---|---|---|---|---|---|---|---|---|
| 1/1 |   | − | − | + | − |   | + | − |   |
| 1/4 | − |   |   | − | − |   | − | − |   |
| 1/5 | − | − |   | − | − |   | − | − |   |
| 2/1 | + | − |   |   | − |   | + | − |   |
| 2/4 | − | − |   | − |   |   |   | − |   |
| 2/5 |   |   |   |   |   |   |   |   |   |
| 3/1 | + | − |   | + | − |   |   | − |   |
| 3/4 | − | − |   | − | − |   | − |   |   |
| 3/5 |   |   |   |   |   |   |   |   |   |

TABLE 5 n-gram 02 instances

| x'th event | instance 1 (EVENTS 03-05) attrs | instance 2 (EVENTS 34-36) attrs |
|---|---|---|
| 1 GET item | frank 23 — | frank 21 — |
| 2 POST cart | frank 1d261e 23 | frank 0ab840 21 |
| 3 GET item | frank 48 — | frank 48 — |

Matrix 4
n-gram 02 correlations

| x/y | 1/1 | 1/4 | 1/5 | 2/1 | 2/4 | 2/5 | 3/1 | 3/4 | 3/5 |
|---|---|---|---|---|---|---|---|---|---|
| 1/1 |   | − |   | + | − | − | + | − |   |
| 1/4 | − |   |   |   | − | + |   | − |   |
| 1/5 |   |   |   |   |   |   |   |   |   |
| 2/1 | + | − |   |   |   |   | + | − |   |
| 2/4 | − | − |   |   |   |   | − | − |   |
| 2/5 | − |   | + |   |   |   | − |   |   |
| 3/1 | + |   |   | + | − |   |   | − |   |
| 3/4 | − | − |   | − | − |   | − |   |   |
| 3/5 |   |   |   |   |   |   |   |   |   |

TABLE 6 n-gram 03 instances

| x'th event | instance 1 (EVENTS 07-09) attrs | instance 2 (EVENTS 24-26) attrs | instance 3 (EVENTS 37-39) attrs |
|---|---|---|---|
| 1 POST cart | frank 1d261e 49 | alice 4c4712 18 | lucy 1d261e — |
| 2 POST order | frank 1d261e — | alice 4c4712 — | lucy 4c4712 — |
| 3 GET order | frank 1d261e — | alice 4c4712 — | chris 0ab840 — |

Matrix 5
n-gram 03 correlations

| x/y | 1/1 | 1/4 | 1/5 | 2/1 | 2/4 | 2/5 | 3/1 | 3/4 | 3/5 |
|---|---|---|---|---|---|---|---|---|---|
| 1/1 |  | − | − | + | − |  | − | − |  |
| 1/4 | − |  |  |  | + |  | − | + |  |
| 1/5 | − |  |  |  |  |  | − |  |  |
| 2/1 | + | − |  |  |  |  |  |  |  |
| 2/4 | − | + |  |  |  |  |  | − | + |
| 2/5 |  |  |  |  |  |  |  |  |  |
| 3/1 | − | − |  |  |  |  |  |  | − |
| 3/4 | − | + | − | + |  |  |  |  |  |
| 3/5 |  |  |  |  |  |  |  |  |  |

TABLE 7 n-gram 04 instances

| x'th event | instance 1 (EVENTS 02-04) attrs | instance 2 (EVENTS 22-24) attrs |
|---|---|---|
| 1 GET items | frank — — | alice — — |
| 2 GET item | frank 23 — | alice 18 — |
| 3 POST cart | frank 1d261e 23 | alice 4c4712 18 |

Matrix 6
n-gram 04 correlations

| x/y | 1/1 | 1/4 | 1/5 | 2/1 | 2/4 | 2/5 | 3/1 | 3/4 | 3/5 |
|---|---|---|---|---|---|---|---|---|---|
| 1/1 |  |  |  | + | − |  | + | − | − |
| 1/4 |  |  |  |  |  |  |  |  |  |
| 1/5 |  |  |  |  |  |  |  |  |  |
| 2/1 | + |  |  |  |  |  | − | + | − |
| 2/4 | − |  |  |  |  |  |  | − | + |
| 2/5 |  |  |  |  |  |  |  |  |  |
| 3/1 | + |  | + | − |  |  |  | − | − |
| 3/4 | − |  |  | − |  |  |  |  |  |
| 3/5 | − |  |  | + | − |  |  |  |  |

TABLE 8 n-gram 05 instances

| x'th event | instance 1 (EVENTS 06-08) attrs | instance 2 (EVENTS 23-25) attrs | instance 3 (EVENTS 36-38) attrs |
|---|---|---|---|
| 1 GET item | frank 49 — | alice 18 — | frank 48 — |
| 2 POST cart | frank 1d261e 49 | alice 4c4712 18 | frank 0ab840 48 |
| 3 POST order | frank 1d261e — | alice 4c4712 — | frank 0ab840 — |

Matrix 7
n-gram 05 correlations

| x/y | 1/1 | 1/4 | 1/5 | 2/1 | 2/4 | 2/5 | 3/1 | 3/4 | 3/5 |
|---|---|---|---|---|---|---|---|---|---|
| 1/1 |  | − |  | + | − | − | + | − |  |
| 1/4 | − |  |  | − | − | + | − | − |  |
| 1/5 |  |  |  |  |  |  |  |  |  |
| 2/1 | + | − |  |  |  |  | − | + | − |
| 2/4 | − | − |  |  |  |  | − | − | + |
| 2/5 | − | + |  | − | − |  |  | − |  |
| 3/1 | + | − |  | + | − |  |  | − |  |
| 3/4 | − |  |  |  | + |  |  |  |  |
| 3/5 |  |  |  |  |  |  |  |  |  |

TABLE 9 n-gram 06 instances

| x'th event | instance 1 (EVENTS 32-34) attrs |
|---|---|
| 1 GET items | frank — — |
| 2 GET item | frank 21 — |
| 3 GET item | frank 21 — |

Matrix 8
n-gram 06 correlations

| x/y | 1/1 | 1/4 | 1/5 | 2/1 | 2/4 | 2/5 | 3/1 | 3/4 | 3/5 |
|---|---|---|---|---|---|---|---|---|---|
| 1/1 |  |  |  | + | − |  | + | − |  |
| 1/4 |  |  |  |  |  |  |  |  |  |
| 1/5 |  |  |  |  |  |  |  |  |  |
| 2/1 | + |  |  |  |  |  | − | + | − |
| 2/4 | − |  |  |  |  |  |  | − | + |
| 2/5 |  |  |  |  |  |  |  |  |  |
| 3/1 | + |  | + | − |  |  |  | − | − |
| 3/4 | − |  |  | − | + |  |  |  |  |
| 3/5 |  |  |  |  |  |  |  |  |  |

TABLE 10 n-gram 07 instances

| x'th event | instance 1 (EVENTS 01-03) attrs | instance 2 attrs (21-23) | instance 3 attrs (31-33) |
|---|---|---|---|
| 1 PUT order | frank 1d261e — | alice 4c4712 — | frank 0ab840 — |
| 2 GET items | frank — — | alice — — | frank — — |
| 3 GET item | frank 23 — | alice 18 — | frank 21 — |

Matrix 9
n-gram 07 correlations

| x/y | 1/1 | 1/4 | 1/5 | 2/1 | 2/4 | 2/5 | 3/1 | 3/4 | 3/5 |
|---|---|---|---|---|---|---|---|---|---|
| 1/1 |  | − |  | + |  |  | + | − |  |
| 1/4 | − |  |  | − |  |  | − | − |  |
| 1/5 |  |  |  |  |  |  |  |  |  |
| 2/1 | + | − |  |  |  |  | + | − |  |
| 2/4 |  |  |  |  |  |  |  |  |  |
| 2/5 |  |  |  |  |  |  |  |  |  |
| 3/1 | + | − |  | + |  |  |  | − |  |
| 3/4 | − | − |  | − |  |  | − |  |  |
| 3/5 |  |  |  |  |  |  |  |  |  |

TABLE 11 n-gram 08 instances

| x'th event | instance 1 (EVENTS 35-37) attrs |
|---|---|
| 1 POST cart | frank 0ab840 21 |
| 2 GET item | frank 48 — |
| 3 POST cart | frank 0ab840 48 |

Matrix 10
n-gram 08 correlations

| x/y | 1/1 | 1/4 | 1/5 | 2/1 | 2/4 | 2/5 | 3/1 | 3/4 | 3/5 |
|---|---|---|---|---|---|---|---|---|---|
| 1/1 |   | − | − | + | − |   | + | − | − |
| 1/4 | − |   |   | − | − |   | − | + | − |
| 1/5 | − |   |   | − | − |   | − | − | − |
| 2/1 | + | − |   |   | − |   | + | − | − |
| 2/4 | − | − |   | − |   |   | − | − | + |
| 2/5 |   |   |   |   |   |   |   |   |   |
| 3/1 | + | − |   | + | − |   |   | − | − |
| 3/4 | − | + | − | − | − |   |   |   | − |
| 3/5 | − | − | − | − | + |   | − |   |   |

TABLE 12 n-gram 11 instances

| x'th event | instance 1 (EVENTS 08-10) attrs | instance 2 (EVENTS 25-27) attrs | instance 3 (EVENTS 38-40) attrs |
|---|---|---|---|
| 1 POST order | frank 1d261e — | alice 4c4712 — | frank 0ab840 — |
| 2 GET order | lucy 1d261e — | lucy 4c4712 — | chris 0ab840 — |
| 3 PUT invoice | lucy 1d261e — | lucy 4c4712 — | chris 0ab840 — |

Matrix 11
n-gram 11 correlations

| x/y | 1/1 | 1/4 | 1/5 | 2/1 | 2/4 | 2/5 | 3/1 | 3/4 | 3/5 |
|---|---|---|---|---|---|---|---|---|---|
| 1/1 |   | − |   | − | − |   | − | − |   |
| 1/4 | − |   |   | − | + |   | − | + |   |
| 1/5 |   |   |   |   |   |   |   |   |   |
| 2/1 | − | − |   |   | − |   | + | − |   |
| 2/4 | − | + |   | − |   |   | − | + |   |
| 2/5 |   |   |   |   |   |   |   |   |   |
| 3/1 | − | − |   | + | − |   |   | − |   |
| 3/4 | − | + |   | − | + |   | − |   |   |
| 3/5 |   |   |   |   |   |   |   |   |   |

Figure 4A:
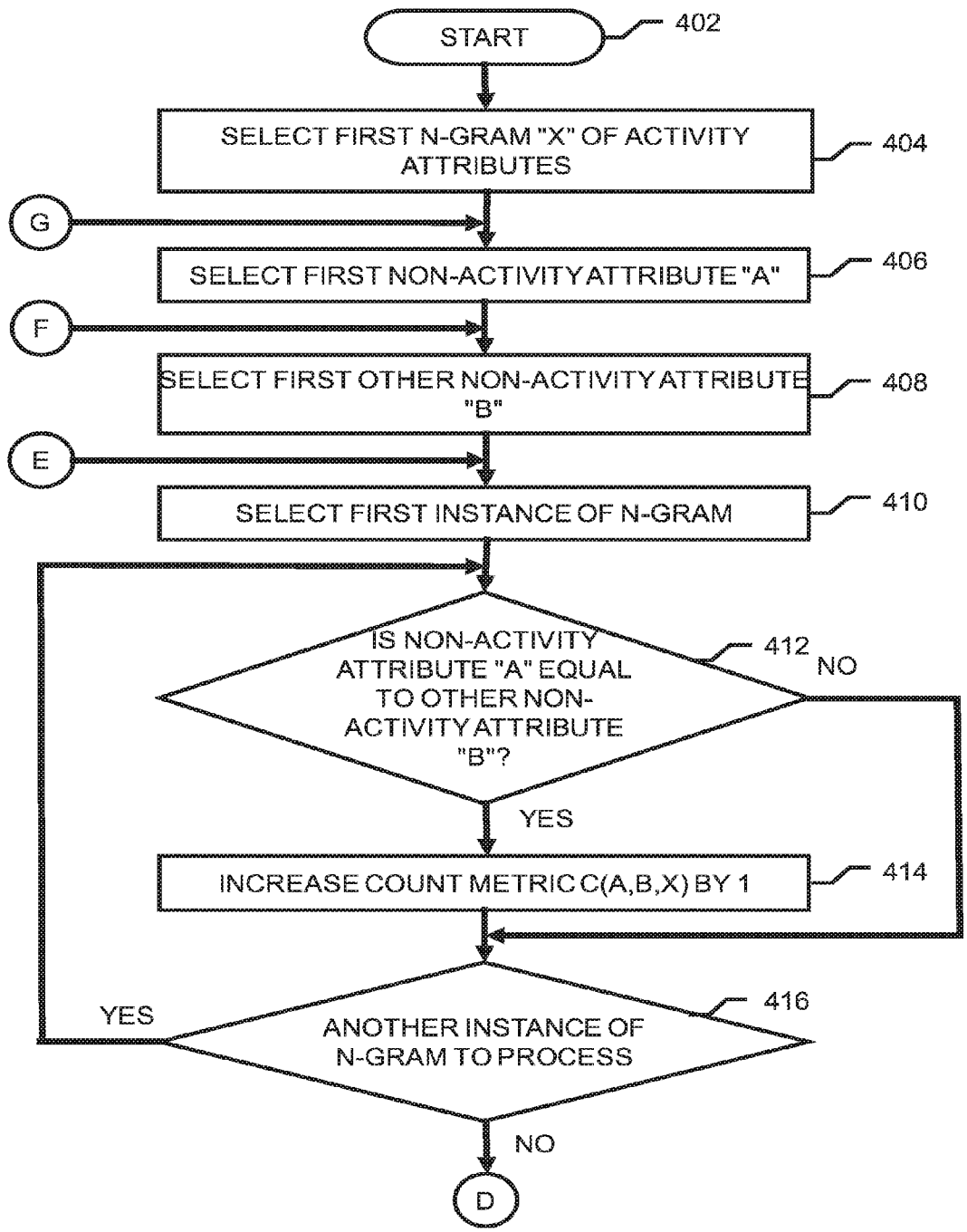
FIGS. 4A and 4B show a flow chart for finding correlations between n-gram non-activity attributes, in accordance with an embodiment of the present invention.
Figure 4B:
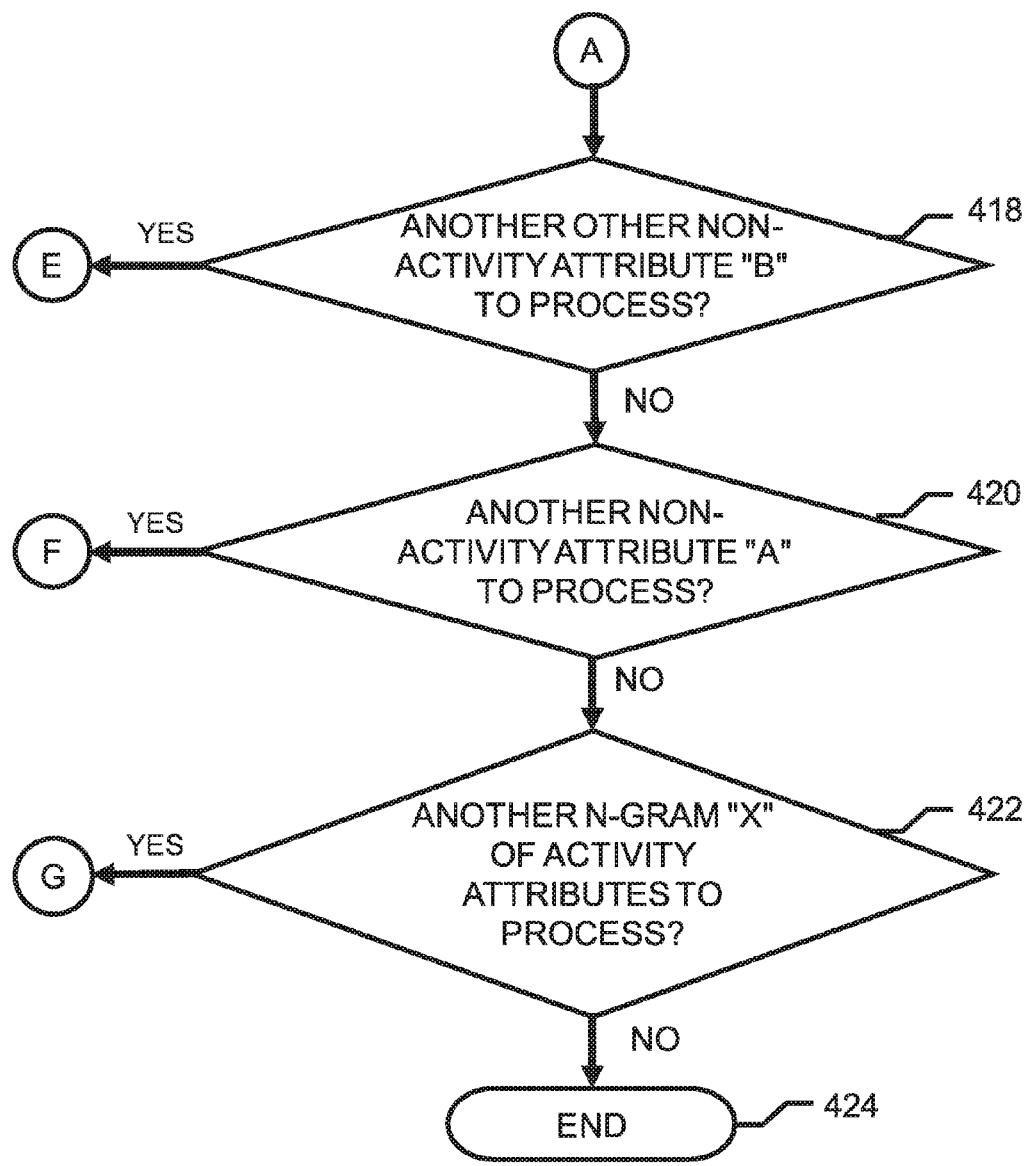

Referring now to FIGS. 4A and 4B, which show a flow chart for finding correlations between n-gram 302-322 non-activity attributes, in accordance with an embodiment of the present invention. The correlations may be represented as repeating patterns of non-activity attributes, inferred separately for each n-gram 302-322 (FIG. 3), based on attribute correlation for every instance of that n-gram 302-322.

Expressed in pseudo-code, the method may operate as follows:
for each n-gram X of activity attributes
  for each non-activity attribute A
    for each other non-activity attribute B {
      for each instance of n-gram
        if A value is equal (or equivalent based on pre-defined criteria) to B value increment the count metric C(A, B, X) by 1}

Correlation begins at 402. At 404, the first n-gram "X" of activity attributes is selected. At 406, the first non-activity attribute "A" in n-gram "X" is selected. At 408, the first of the other non-activity attributes "B" is selected. At 410, the first instance of n-gram "X" is selected.

At 412, for each first non-activity attribute of each of the successive events within the n-gram, a correlation with all the other second non-activity attributes of each of the successive events within the n-gram is generated. A determination is made as to whether non-activity attribute "A" is equal to the other non-activity attribute "B". A correlation metric is generated as a function of the number of non-activity attributes and the total number of non-activity attributes of each of the successive events within the n-gram. In an embodiment, if non-activity attribute "A" is equal to another non-activity attribute "B", then a count metric C(A,B,X) in increased, at 414, by 1. If non-activity attribute "A" is not equal to the other non-activity attribute "B", then the count metric C(A,B,X) remains unchanged and processing continues at 416.

At 416, a check is made as to whether there are any more instances of the n-gram to process. If there are more instances left to process, then processing returns to 412. If there are no more instances of the n-gram left to process, then processing continues at 418. At 418, a check is made as to whether there are any additional other non-activity attributes "B" to process. If there are more other non-activity attributes "B" left to process, then returns to 410. If there are no additional other non-activity attributes "B" left to process, then processing continues at 420, where a check is made to determine whether there are any more non-activity attributes "A" to process. If there are more non-activity attributes "A" left to process, processing returns to 408. If there are no more non-activity attributes "A" left to process, processing continues at 422, where a check is made to determine whether there are any more n-gram "X" activity attributes to process. If there are more n-gram "X" activity attributes left to process, then processing returns to 406. If there are no more n-gram "X" activity attributes left to process, processing ends at 424.

In an embodiment, the correlation metric may include the number of instances in which the first non-activity attribute of each of the successive events 120-190 within the n-gram 302-322 correlates with one of the second non-activity attributes of each of the successive events 120-190 within the n-gram 302-322, divided by the total number of instances of possible correlations between first non-activity attributes and second non-activity attributes.

In an embodiment, the correlation between each first non-activity attribute of each of the successive events 120-190 within the n-gram 302-322 and all other second non-activity attributes of each of the successive events 120-190 within the n-gram 302-322 may include one of "always", "never," or "sometimes". The correlation metric between attributes A and B of n-gram X may be calculated as a ratio between the count of equal values and the total number of instances. In particular if the metric is 0, it means that attributes never have the same value, if 1 they always have the same value.

In an embodiment, the correlation for each attribute of each n-gram 302-322 may be recorded as one of three values: always, never or sometimes. Recording these correlations allows the systematic capture of various security characteristics of the system, such as ethical walls, separation of duty, access controls, etc. without modeling them explicitly. Embodiments of the present invention may allow the systematic capture of the various security characteristics to be realized with minimal processing and memory cost.

Although the correlation may be captured for relatively small sub-sequences (n-grams 302-322), because the n-grams 302-322 generated for a system log 108 overlap by n−1 events, the attribute correlations may be effectively captured for a much longer part of the system log 108. For example, if a sub sequence of length 3, the 3-grams generated for the system log 108 overlap by 2 events.

In an embodiment, correlations between each first non-activity attribute of each of the successive events 120-190 within an n-gram 302-322 and all other second non-activity attributes of each of the successive events 120-190 within that n-gram 302-322 can be recorded with their actual numeric metric between 0 and 1, rather than always, never or sometimes. The numeric value represents the proportion of instances out of the total instances for which the non-activity attributes correlate. Although the record of the actual numerical metric may not be helpful for anomaly detection, having the actual numeric metric recorded may allow for the verification of system operations over a longer time period and for the observation of attribute correlation changes.

In another embodiment, correlations between different n-gram 302-322 attributes may be captured, in addition to correlation of single n-grams 302-322 separately. This n-gram 302-322 to n-gram 302-322 correlation may only be captured when n-grams 302-322 do not overlap. For each first non-activity attribute of events 120-190 within the n-gram 302-322, a correlation is generated with all other third non-activity attributes of events 120-190 within a different non-overlapping n-gram 302-322.

Figure 5:
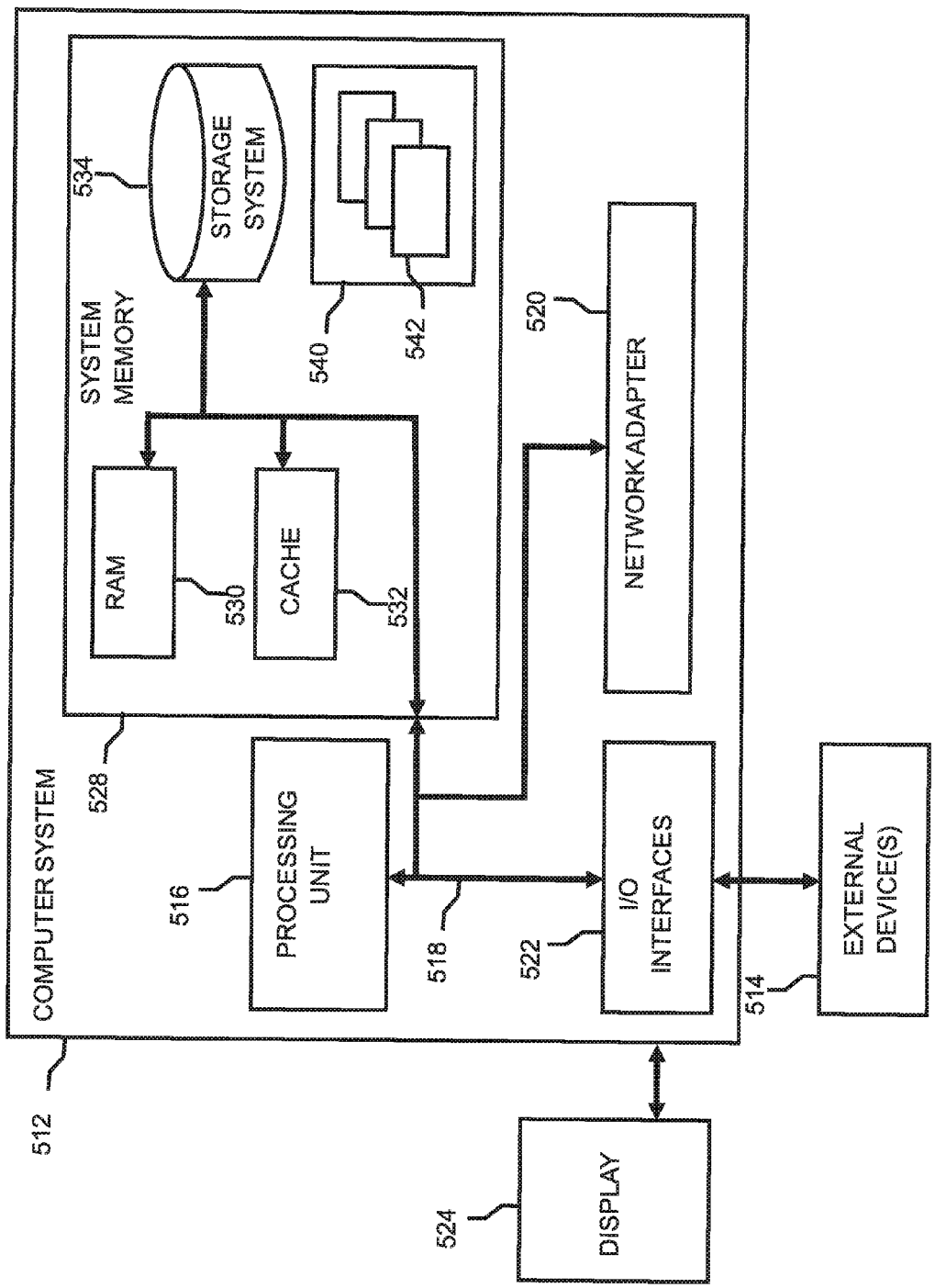
FIG. 5 shows a computer system in which embodiments of the present invention may be practiced.

Referring now to FIG. 5, a schematic of an exemplary computer system 512 in which embodiments of the present invention may be practiced. Computer system 512 is only one example of a suitable computing system and is not intended to suggest any limitation as to the scope of use or functionality of embodiments of the invention described herein. Regardless, computer system 512 is capable of being implemented and/or performing any of the functionality set forth hereinabove.

Computer system/server 512 is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying correlations between events recorded in a system log of a computer, the recorded events generated by a plurality of processes executing on the computer, the method comprising:

partitioning, by the computer, a system log into a plurality of segments, each segment associated with a characteristic found in an event, each segment including one or more events having a same characteristic value;

selecting, by the computer, a plurality of attributes of the one or more events in a segment, wherein the plurality of attributes do not describe an action of the event;

generating, by the computer, one or more distinct n-grams, each distinct n-gram including the selected attributes from successive events within the segment, wherein a distinct n-gram is distinct from all other generated n-grams;

identifying, by the computer, a correlation for each first selected attribute of each of the successive events of an n-gram with all other second selected attributes from each of the successive events of the n-gram;

generating, by the computer, a correlation metric as a function of the number of correlated first selected attributes and the total number of selected attributes of each of the successive events of the n-gram, wherein generating the correlation metric includes:

incrementing, by the computer, a count of n-gram instances in which the first selected attribute of each of the successive events of the n-gram correlates with one of the second selected attributes of each of the successive events of the n-gram; and dividing, by the computer, the count by a total number of possible correlations between the first selected attributes and the second selected attributes; and recording, by the computer, the correlations for each first selected attribute.

2. The method according to claim 1, wherein a correlations is one of: always, never, or sometimes.

3. The method according to claim 1, wherein a correlation is a numeric value between zero and one representing a proportion of n-gram instances out of a total number of n-gram instances for which the first selected attributes correlate with a second selected attribute.

4. The method according to claim 1, further comprising:

identifying, by the computer, a correlation for each first selected attribute of each of the successive events of one of the one or more n-grams with all other third selected attributes of each event of a different non-overlapping n-gram.

* * * * *